Patented Mar. 2, 1943

2,312,966

UNITED STATES PATENT OFFICE 2,312,966

POLYMERIC MATERIAL

William E. Hanford, Wilmington, Del., assignor to E. I. du Pont de Nemours & Company, Wilmington, Del., a corporation of Delaware No Drawing. Application April 1, 1940, Serial No. 327,324

7 Claims. (Cl. 260—78)

This invention relates to polymeric materials and more particularly to new polyamides.

In U. S. Patent 2,071,253 are described a number of polyamides derived from the polymerization of amino acids and their amide-forming derivatives. These polyamides have high molecular weights, are extremely strong, and can be formed into useful fibers. For such uses as coating compositions and films, however, these polyamides have the disadvantage that they are insoluble in common organic solvents, being soluble only in such materials as phenols and formic acid, and absorb fairly large amounts of water.

This invention has as an object the preparation of new and useful polymeric materials. A further object is the preparation of polyamides of special utility in the preparation of coating compositions and films. Other objects will appear hereinafter.

The above objects are accomplished by heating at amide-forming temperatures a polymer-forming composition comprising an acyclic monoaminomonocarboxylic acid which contains a chain of at least 16 atoms, has its amino group attached to a secondary carbon atom, and has at least five atoms separating the amino and carboxyl groups. It is to be understood that mention herein of an amino acid is intended to include also its amide-forming derivatives, such as the anhydride, ester, amide, and acid halide, as well as derivatives wherein the amino nitrogen atom bears an alkyl or a formyl group.

Structurally, these acylic monoaminomonocarboxylic acids may be represented as follows:

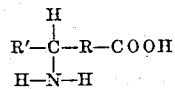

in which R is a divalent organic radical having a chain length of at least 4, R' is a monovalent organic radical, and R'—C—R—C, which represents the "chain length of the acid", has at least 16 atoms in the chain. Preferably R' is a hydrocarbon radical containing from 5 to 9 carbon atoms and preferably R is a hydrocarbon radical containing from 7 to 12 atoms. However, R and R' may be heteroatomic radicals containing oxygen, sulfur, or nitrogen in addition to carbon. It will be observed that the minimum radical length of the amino acid is 7, wherein "radical length" refers to the number of atoms in the chain between and including the carbon of the carboxyl group and the nitrogen of the amino group. In terms of the above formula, the radical length is represented by the number of atoms in the chain N—C—R—C. The preferred acids have radical lengths of 10 to 15. Thus 12-aminostearic acid which is one of the preferred amino acids has a radical length of 13 and a chain length of 18.

Although this invention includes polyamides derived solely from the above mentioned amino acids, the preferred polyamides are those derived from polymer-forming compositions containing in addition to an amino acid of the above type other polyamide-forming reactants, and particularly a mixture of diamine and dibasic acids which is preferably used in the form of the diamine-dibasic acid salt. These polyamides, which can be referred to as interpolyamides, are preferred because they are more flexible, in general have a higher melting point, and can usually be prepared more economically.

The term "polyamide" as used herein includes not only the polymers which are obtained solely from the above mentioned amino acids or from mixtures of the above mentioned amino acids with other polyamide-forming compositions, but includes also the polymers obtained from mixtures of the above amino acids with other polymer-forming reactants. The polymers thus obtained contain a plurality of amide groups as an integral part of the main chain of atoms and may, therefore, be referred to as polyamides. On hydrolysis with hydrochloric acid the polyamides of this invention yield the hydrochloride of the amino acid used in their preparation.

In the usual procedure for carrying out the invention the amino acid, with or without other polymer-forming ingredients, is heated in a closed reaction vessel at polymerizing temperatures until a low molecular weight polyamide is formed. The temperatures employed are between about 120° and 300° C., and in most instances between 200° and 285° C. The optimum temperature and time of reaction vary with the nature of the reactants and the proportions in which they occur and also vary with the softening point of the polymerized product. In order to produce a high molecular weight polyamide, which is desired for most purposes, the heating is continued at polymerizing temperatures under conditions which permit the removal of the liberated water, alcohol, ammonia or other secondary product at atmospheric or reduced pressure. Formation of a high molecular weight product is evidenced by the fact that the polymer is tough and can be formed into films or into pliable filaments. The high molecular stage is not in general reached until the polymer has an intrinsic viscosity of at least 0.4, where intrinsic viscosity is defined as in Patent 2,130,948. The entire process is desirably carried out in the absence of oxygen which can be done, for example, by operating in the presence of an inert gas, such as nitrogen or carbon dioxide, or by operating under reduced pressure.

The following examples, in which the quantities of reagents are parts by weight, are presented to illustrate in greater detail the processes of this invention. Examples I–III illustrate the preparation of polyamides from the amino acids alone, whereas the remaining examples and the table following the examples illustrate the preparation of the more preferred products of this invention, i. e. the inter polyamides.

*Example I*

12-aminostearic acid was heated in a sealed pressure vessel at 210–230° C. for 16 hours. The low molecular weight polyamide thus formed was then heated at 5–15 mm. pressure at 255° C. for 15 hours. The resulting polymer softened at 109° C., had an intrinsic viscosity of 0.63, and could be spun into fibers. The material was soluble in the lower alcohols such as ethanol and the butanols and in alcohol-aromatic hydrocarbon mixtures. It could be hot-pressed or solvent-cast to give films of exceptional pliability, toughness, and elasticity. Samples of these films absorbed less than 0.5% water at 100% R. H. (relative humidity). In contrast the polymer of 17-amino-heptadecanoic acid, a long chain amino acid in which the amino group is attached to a primary carbon atom, is insoluble in the above mentioned solvents and absorbs twice as much water at 100% R. H.

*Example II*

Methyl 12-aminostearate was heated at 200° C. in a sealed tube for 3.5 hours. Heating was then continued at 1 mm. pressure for 2 hours at 200° C. and for an additional 3 hours at 255° C. The resulting polymer was spun from melt into pliable filaments. The filaments could be cold drawn.

*Example III*

A mixture of 9- and 10-aminostearic acid was heated at 255° C. for 20 hours at 3–4 mm. pressure. The polymer softened at 110° C., had an intrinsic viscosity of 0.73 and could be formed into fibers and films. It was soluble in hot ethanol and in chloroform-methanol mixtures, and somewhat soluble in hot toluene.

*Example IV*

Equal parts of a mixture of 9- and 10-aminostearic acid and of hexamethylenediamine-adipic acid salt were heated together in a sealed reaction vessel at 200–210° C. for 3 hours. The resulting low molecular weight polyamide was then heated at atmospheric pressure in an atmosphere of nitrogen for 1.5 hours at 285° C. Polymerization was completed by heating for 3 hours at 285° C. at a pressure of 5–15 mm. The polyamide softened at 147° C., had an intrinsic viscosity of 0.6, and could be spun and cold-drawn. It was soluble in the lower aliphatic alcohols and in alcohol-aromatic hydrocarbon mixtures.

*Example V*

Equal parts of 12-aminostearic acid and hexamethylenediamine-adipic acid salt were placed in a stainless steel autoclave. The temperature of the reaction mixture was held at 210–230° C. for 3.5 hours, the pressure rising from atmospheric to 250 lbs./sq. in. The water formed in the reaction was then removed during ½ hour, by slowly reducing the pressure to atmospheric, the temperature of the reaction mixture dropping to about 200° C. Heating was continued under 5 mm. pressure for an additional 3.5 hours at a temperature of 250–260° C. The material thus obtained had a softening point of 168° C., an intrinsic viscosity of 0.99, and a tensile strength of 6,500 lbs./sq. in. It was spinnable into filaments which could be cold-drawn. The material was soluble in chloroform-methanol mixtures and in furfuryl alcohol. Hot-pressed or solvent-cast films showed exceptional toughness and resistance to heat embrittlement. Water absorption was less than 4% at 100% R. H. The polyamide derived from hexamethylenediamine and adipic acid alone absorbs about 8% moisture at 100% R. H.

*Example VI*

A mixture of equal parts of 12-aminostearic acid and hexamethylenediamine-sebacic acid salt was heated in a sealed pressure vessel for 2 hours at 210° C. The low molecular weight polyamide thus obtained was then heated in an atmosphere of nitrogen at atmospheric pressure for 1.5 hours at a temperature of 285° C. Heating was continued at a pressure of 5–15 mm. for 2.5 hours at 285° C. The polymer had a softening point of 156° C. and an intrinsic viscosity of 0.77. Hot-pressed films were quite tough and durable and could be spun and cold-drawn. Water absorption was below 2.5% at 100% R. H. Hexamethylenediamina-sebacic acid polymer absorbs about 4% moisture at 100% R. H.

*Example VII*

A mixture of 10 parts 12-aminostearic acid, 6 parts ε-caprolactam, and 9 parts hexamethylenediamine-adipic acid salt was heated in a sealed tube at 210° C. for 1 hour and than at 255° C. for 17 hours. Heating was continued at a pressure of 2 mm. at 255° C. for 3 hours. The polymer thus obtained had a softening point of 118–120° C. and an intrinsic viscosity of 0.99. The material was tough and spinnable and had a water absorption of less than 8% at 100% R. H. The polyamide comprised of 9 parts hexamethylenediamine-adipic acid and 6 parts ε-caprolactam absorbs about 13% moisture at 100% R. H.

Additional examples of interpolyamides derived from 12-aminostearic acid are listed in the following table:

*12-aminostearic acid interpolyamides* [1]

| Composition (parts by weight of reactants) | Softening point, °C. | Intrinsic viscosity | Percent water absorption | |
|---|---|---|---|---|
| | | | at 50% R. H. | at 100% R. H. |
| 12-aminostearic acid (90), hexamethylenediamine-adipic acid salt (10) | 103 | 0.77 | 0.0 | 0.4 |
| 12-aminostearic acid (75), hexamethylenediamine-adipic acid salt (25) | 107 | 0.82 | 0.6 | 3.0 |
| 12-aminostearic acid (60), hexamethylenediamine-adipic acid salt (40) | 135 | 1.00 | 1.0 | 3.5 |
| 12-aminostearic acid (40), hexamethylenediamine-adipic acid salt (60) | 196 | 1.12 | 1.0 | 3.9 |
| 12-aminostearic acid (5), hexamethylenediamine-adipic acid salt (95) | 244 | 0.89 | 1.7 | 7.0 |
| 12-aminostearic acid (50), p-bis(2-aminoethyl)benzene-sebacic acid salt (50) | 201 | 0.59 | | |
| 12-aminostearic acid (40), caprolactam (60) | 149 | 0.86 | 1.4 | 7.0 |
| 12-aminostearic acid (15), hexamethylenediamine-adipic acid salt (45), 6-aminocaproic acid (40) | 149 | | | |
| 12-aminostearic acid (30), hexamethylenediamine-adipic acid salt (25), hexamethylenediamine-sebacic acid salt (45) | 149 | | | |
| 12-aminostearic acid (15), hexamethylenediamine-sebacic acid salt (55), 6-aminocaproic acid (30) | 150 | 1.03 | | |
| 12-aminostearic acid (30), hexamethylenediamine-adipic acid salt (45), hexamethylenediamine-sebacic acid salt (15), 6-aminocaproic acid (10) | 175 | 0.95 | | |

[1] The dashes in the table indicate that no measurement was made.

The preferred interpolymers are obtained by reacting the above described long chain amino acids with other bifunctional reactants, as for instance those disclosed in U. S. Patent 2,071,250. Particularly valuable for this purpose are other polyamide-forming reactants which, as indicated in the foregoing table, may be either those of the amino acid type described in U. S. Patent 2,071,253 or those of the diamine-dibasic acid type described in U. S. Patent 2,130,948. Additional bifunctional reactants useful in the preparation of the linear interpolymers include hydroxy acids and alkanolamine-dibasic acid systems. The polyamides of this invention are, however, also desirably modified for some purposes by including in the reaction mixture from which the polymers are prepared such materials as pigments, plasticizers or resinous materials, e. g. phenol-formaldehyde resins. To prevent increase in molecular weight with consequent undesirable increase in viscosity during melt spinning of filaments it is desirable to include with the reactants from which the polyamides are prepared a viscosity stabilizing agent, as for instance a small amount of acetic or propionic acid or similar amide-forming reactant.

Although the preferred embodiment comprises heating the reactants until they have a sufficiently high molecular weight to exhibit good film-forming properties, it is within the scope of this invention to discontinue heating before this stage. The low molecular weight polymers are useful for certain applications, e. g. in finely divided form for use as carriers for dyes in making organic pigments.

In addition to the several above-mentioned amino-stearic acids, the products of this invention may be obtained with other amino acids which comply with the requirements previously specified. Examples of such acids, in which the chain may be composed entirely of carbon or may be heteroatomic, are as follows:

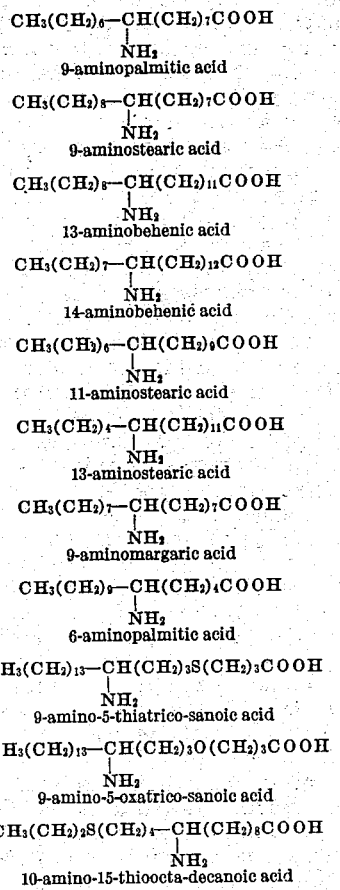

The polyamides of this invention can be formed into films and fibers possessing marked toughness and elascity. These polyamides are further characterized by their good solubility in organic solvents and by their low water absorption. For instance, they are soluble in such solvents as ethanol, butanol, and alcohol-aromatic hydrocarbon mixtures, in which the previously known amino acid polyamides, including those obtained from the long chain omega amino acids, are insoluble. This combination of desirable properties possessed by the polyamides of this invention has not been obtained before in polyamides of the amino acid type. The present products are useful generally as ingredients in molding, coating, impregnating, and adhesive compositions. The low water absorption and exceptional resistance to abrasion and heat embrittlement make these polyamides particularly valuable for use as electrical insulation compositions. Other uses are as bristles, rods, tubes, ribbons, wrapping films, and as a photographic film base. When these particles are made from the molten polymer it is desirable to effect rapid chilling of the articles during their formation, e. g. by exposure to a cool surface or by quenching with a non-solvent for the polyamide, e. g. water. The extreme water insensitivity and good solubility of the present polyamides make possible their use in various types of waterproof coatings by application as a clear lacquer or pigmented enamel. The polymers may also be applied from melt as coatings on fabrics, paper, metal, and other surfaces. In the above and in other uses, the polyamides can be admixed with other polymers, resins, e. g. phenol-formaldehyde resins, plasticizers, pigments, dyes, fillers, antioxidants, and other modifying agents.

Although polyamides derived solely from the long chain amino acids of this invention are of limited utility in making fibers because of their low melting point, high melting polyamides modified by preparation in the presence of a small amount of such an amino acid have better melt spinning properties than the unmodified high melting polyamide. Thus the polyamide prepared by polymerizing hexamethylenediamine-adipic acid salt in the presence of 1 to 5% of weight of 12-aminostearic acid can be spun from melt into high tenacity yarn at a faster rate than unmodified polyhexamethylene adipamide. This improvement is believed to be associated with the fact that the modified polyamide is less crystalline than the unmodified polyamide or at least has less tendency to crystallize on cooling from the melt. For the same reason the modified polyhexamethylene adipamide is more readily obtained in the form of transparent films than the unmodified polymer.

As many apparently widely different embodiments of this invention may be made without departing from the spirit and scope thereof, it is to be understood that I do not limit myself to the specific embodiments thereof except as defined in the appended claims. It should be understood, however, that the mention of "acid" in the appended claims includes also amide-forming derivatives of the acid.

I claim:

1. A process for making polyamides which comprises reacting by heating under amide-forming conditions different polyamide-forming compositions one of which is a mixture of a diamine and a dicarboxylic acid and another of which is an acyclic monoaminomonocarboxylic acid of the formula

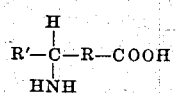

wherein R is a hydrocarbon radical containing 7 to 12 atoms, R' is a hydrocarbon radical containing 5 to 9 carbon atoms, and R'—C—R—C has a chain length of at least 16 atoms, and continuing the reaction under said conditions until the polymer obtained can be spun into filaments which can be cold drawn.

2. An interpolyamide comprising the reaction product of different polyamide-forming compositions one of which is a mixture of a diamine and a dicarboxylic acid and another of which is an acyclic monoaminomonocarboxylic acid of the formula

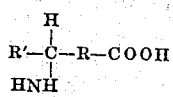

wherein R is a hydrocarbon radical containing 7 to 12 atoms, R' is a hydrocarbon radical containing 5 to 9 carbon atoms and R'—C—R—C has a chain length of at least 16 atoms.

3. An interpolyamide comprising the reaction product of different polyamide-forming compositions one of which is a mixture of a diamine and a dicarboxylic acid and another of which is an aminostearic acid wherein the amino group is attached to carbon in one of the positions 9 to 12 numbered from and including the carboxyl carbon.

4. An interpolyamide comprising the reaction product of two different polyamide-forming compositions which consist essentially of 12-aminostearic acid and a diamine-dibasic acid mixture and in which the 12-aminostearic acid is present in amount from 1% to 60%, said interpolyamide having a softening point substantially higher than the polyamide obtained from said 12-aminostearic acid alone.

5. A coating composition comprising the interpolyamide defined in claim 2.

6. A filament comprising the interpolyamide defined in claim 2.

7. A self-supporting film comprising the interpolyamide defined in claim 2.

WILLIAM E. HANFORD.